UNITED STATES PATENT OFFICE.

SPENCER C. GRAVES, OF ST. LOUIS, MISSOURI.

WATERPROOF COMPOSITION.

1,382,077.  Specification of Letters Patent.  Patented June 21, 1921.

No Drawing.  Application filed February 21, 1921. Serial No. 446,847.

*To all whom it may concern:*

Be it known that I, SPENCER C. GRAVES, a citizen of the United States, residing in the city of St. Louis and State of Missouri, have invented new and useful Improvements in Waterproof Compositions, of which the following is a specification.

This invention relates to a composition of matter for use as a liquid proof coating for fabric and other surfaces.

The object of the invention is to provide an improved liquid proof composition which is much less inflammable than nitro cellulose products, which is flexible and which penetrates the fabric or porous surfaces, and which will not break or exfoliate.

The composition may be satisfactorily compounded by use of the ingredients named below, in about the proportions stated:

| | |
|---|---|
| De-natured alcohol | 2 ounces |
| Pure benzol | ½ ounce |
| Acetone, U. S. P. | 5 drams |
| Soluble cotton | 1½ drams |
| Corn starch | 3 drams |

The stated ingredients are thoroughly mixed and, if desired, appropriate oils may be added for specific purposes, but the addition of oils does not materially change the functioning of the composition. Mineral oils serve best for fabrics, and vegetable oils for other purposes. The composition is of a paste like consistency which spreads well and may be readily applied and has more or less tendency to contract.

The composition is perfectly flexible and penetrates fabric or porous surfaces to render them perfectly water proof, and also spreads over the surfaces to form a smooth surface coating. The starch gives the desired adhesive properties and by using the proper amount of starch the composition may be made to function as a glue.

The composition may be thinned by the addition of de-natured alcohol. The contractile characteristic may be increased by decreasing the quantity of acetone used, so that when it is desired to apply the composition to fabrics the stated proportion of acetone should be used.

I claim:

1. An improved water proof composition, comprising de-natured alcohol, benzol, acetone, soluble cotton and starch.

2. An improved water proof composition, comprising de-natured alcohol, pure benzol, acetone U. S. P., soluble cotton and corn starch.

3. An improved water proof composition, comprising de-natured alcohol in the proportion of two ounces, benzol in the proportion of one-half ounce, acetone in the proportion of five drams, soluble cotton in the proportion of one and a half drams and starch in the proportion of three drams.

4. An improved water proof composition, comprising two ounces de-natured alcohol, one-half ounce pure benzol, five drams of acetone U. S. P., one and one-half drams of soluble cotton, and three drams corn starch.

SPENCER C. GRAVES.